United States Patent [19]

Dakin

[11] 4,355,898
[45] Oct. 26, 1982

[54] OPTICAL DETECTING, MONITORING OR MEASURING ARRANGEMENTS

[75] Inventor: John P. Dakin, Southampton, England

[73] Assignee: Plessey Overseas Limited, Ilford, England

[21] Appl. No.: 152,714

[22] Filed: May 23, 1980

[30] Foreign Application Priority Data

May 23, 1979 [GB] United Kingdom ............... 7918056

[51] Int. Cl.³ .............................................. G01B 9/02
[52] U.S. Cl. ............................... 356/346; 350/162 R; 356/354
[58] Field of Search ............................. 356/346, 354; 350/162 R

[56] References Cited

U.S. PATENT DOCUMENTS 3,988,671  3/1975  Pedinoff ..................... 350/162 R X Primary Examiner—John K. Corbin
Assistant Examiner—Matthew W. Koren
Attorney, Agent, or Firm—Fleit & Jacobson

[57] ABSTRACT

According to the present invention there is provided an optical detecting, monitoring or measuring arrangement, comprising a movable diffraction grating arranged for angular displacement by means responsive for example to changes in one or more parameters, such as temperature or pressure, whereby the color of light being reflected to a light-receiving point from said grating changes and said light is then directed onto a fixed diffraction grating so that the direction of a light beam consequentially reflected from said fixed diffraction grating changes with change in color, such change in direction being dependent upon and providing an indication of the change in said parameter or parameters.

3 Claims, 1 Drawing Figure

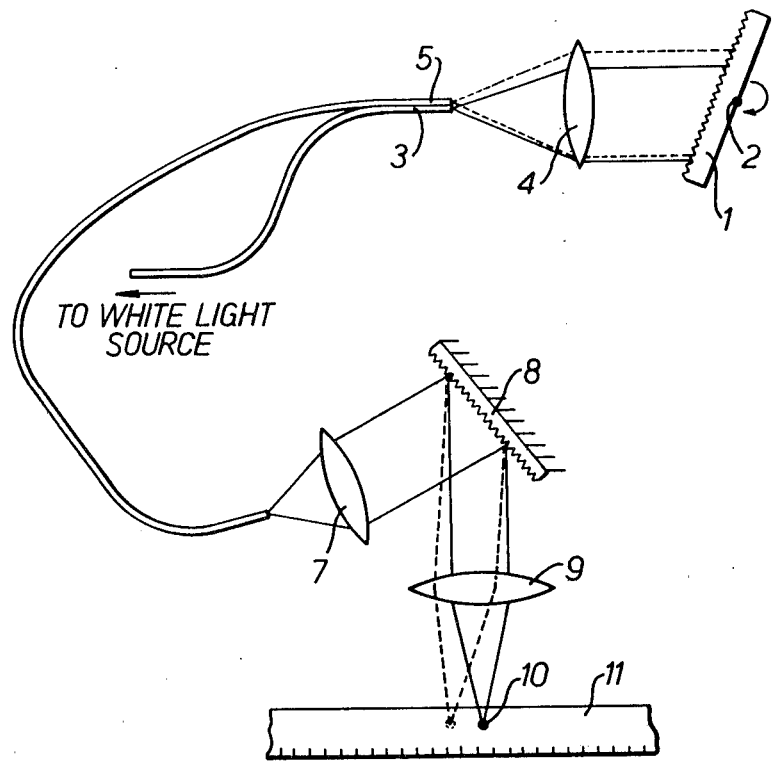

OPTICAL DETECTING, MONITORING OR MEASURING ARRANGEMENTS

This invention relates to optical detecting, monitoring or measuring arrangements and is especially, but not exclusively, concerned with such arrangements for measuring or monitoring various parameters (e.g. temperature, voltage or pressure) in hazardous (e.g. explosive or high voltage) or normally inaccessible locations.

According to the present invention there is provided an optical detecting, monitoring or measuring arrangement, comprising a movable diffraction grating arranged for angular displacement by means responsive for example to changes in one or more parameters, such as temperature or pressure, whereby the colour of light being reflected to a light-receiving point from said grating changes and said light is then directed onto a fixed diffraction grating so that the direction of a light beam consequentially reflected from said fixed diffraction grating changes with change in colour, such change in direction being dependent upon and providing an indication of the change in said parameter or parameters.

In carrying out the present invention it may be arranged that a beam of white light derived for example from a tungsten filament lamp and emerging from first optical fibre means is suitably collimated by lens means before being directed on to the movable diffraction grating. The reflected light beam of a colour dependent upon the angular position of the grating may then be focused, conveniently by the same lens system as provides the aforesaid collmation, on to one end of further optical fibre means located at said light-receiving point which conveys the coloured light received at said point to a remote location where the coloured light emerging therefrom is again suitably collmated by lens means before being directed on to a fixed diffraction grating. The reflected light beam from the fixed diffraction grating assumes a direction dependent upon the colour of the incident light falling on the grating. This reflected light beam may be focused by lens means to provide a spot of light the position of which along a scale, or the location of which detected by a detector array of photoresponsive devices, provides an indication of the angular position of the movable diffraction grating and thus the value of the parameter being measured or monitored at that particular instant in time.

By way of example the present invention will now be described with reference to the accompanying single-FIGURE drawing which shows one embodiment of the present invention.

Referring to the drawing this shows an optical system suitable for measuring or monitoring changes in the values of parameters such as temperature or pressure for example, and comprises a diffraction grating 1 which is mounted for rotation about an axis 2 in dependence upon changes in temperature or pressure for example.

In operation of the system white light derived for instance from a tungsten lamp (not shown) emerges from a single optical fibre or bundle of fibres indicated at 3 and is then collmated to provide a parallel beam by means of a convex lens 4. This beam of white light incident upon the diffraction grating 1 divides into a spectrum of coloured beams one of which is focused by the lens 4 on to the end of a further optical fibre or bundle of fibres indicated at 5 and located closely adjacent the optical fibure or bundle 3. The particular colour of the light focused on to the end of optical fibre 5 will depend upon the angular position of the diffraction grating 1. The coloured light entering the optical fibre 5 is conveyed by the fibre to a remote point where the light emerges and is then collmated by a further convex lens 7 to produce a parallel beam which is directed on to a fixed diffraction grating 8 which reflects a beam of coloured light in a direction dependent upon the colour of the light beam. This reflected light beam the direction of which is dependent upon colour and thus the angular position of the movable diffraction grating is then focused by means of a further lens 9 to produce a spot of light 10 the position of which on a scale 11 indicates the position of the movable diffraction grating and thus provides an indication of the value of the parameter being measured or monitored, as the case may be. Instead of the scale 11 being used the spot may be arranged to move over a linear detector array of photosensitive devices so that the position of the spot can be electronically sensed by means of the array.

The movable diffraction grating 1 may for exmple be coupled to means responsive to temperature, pressure or voltage and it will be appreciated that due to the remote indication and non-conductive character of the system the system is particularly advantageous in applications where the location at which measurement or monitoring it to take place is either hazardous or normally inaccesible. For example, in the case of measuring temperature the movable diffraction grating 1 may be coupled to but remote from the centre of a bimetallic coil sensor whereby the diffraction grating rotates in response to changes in temperature. If the system is used in the measurement of pressure the diffraction grating 1 may conveniently be coupled to the centre of a coiled Bourdon Tube so that the diffraction grating rotates in response to change in pressure. In the measurement of high voltages the diffraction grating 1 may be coupled to the moving system of a voltmeter but the voltage indication means may be remote from these high voltages.

One particular use for the optical system of this invention is in petrol gauges where the float normally employed in such gauges may be arranged to produce rotation of the diffraction grating as the level of petrol in the petrol tank changes. Since there are no electrical connections to be made in the optical measuring system the system is totally safe.

What we claim is:

1. An optical detecting, monitoring or measuring arrangement comprising a movable diffraction grating arranged to have a beam of white light incident thereon and arranged for angular displacement by means responsive to changes in one or more parameters whereby the colour of light being reflected to a light receiving point from said grating changes and said light is then directed onto a fixed diffraction grating so that the direction of a light beam consequentially reflected from said fixed diffraction grating changes with change in colour, said change in direction being dependent upon and providing an indication of the change in said parameter or parameters.

2. An optical detecting, monitoring or measuring arrangement as claimed in claim 1, wherein the beam of white light arranged to emerge from first optical fibre means is collimated by lens means before being directed onto the movable diffraction grating, the reflected light beam of a colour dependent upon the angular position of the grating being focussed onto one end of further optical fibre means located at said light-receiving point which conveys the coloured light received at said point to a remote location where the coloured light emerging therefrom is again collimated by lens means before being directed onto a fixed diffraction grating, the reflected light beam from said fixed diffraction grating assuming a direction dependent upon the colour of the incident light falling on the grating.

3. An optical detecting, monitoring or measuring arrangement as claimed in claim 2, wherein the reflected light beam from the fixed diffraction grating is focused by lens means to provide a spot of light, the position of which along a measuring device provides an indication of the angular position of the movable diffraction grating.

* * * * *